(12) United States Patent
Diamond et al.

(10) Patent No.: US 11,145,141 B2
(45) Date of Patent: Oct. 12, 2021

(54) ELECTRIC VEHICLE PREDICTIVE RANGE ESTIMATING SYSTEMS AND METHODS

(71) Applicant: Ford Global Technologies, LLC, Dearborn, MI (US)

(72) Inventors: Brendan Diamond, Grosse Pointe, MI (US); Erik Christen, Royal Oak, MI (US); Kevin James Rhodes, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 16/297,304

(22) Filed: Mar. 8, 2019

(65) Prior Publication Data

US 2020/0286305 A1 Sep. 10, 2020

(51) Int. Cl.
| | |
|---|---|
| *G07C 5/00* | (2006.01) |
| *B60L 3/12* | (2006.01) |
| *B60L 53/60* | (2019.01) |
| *B60L 58/12* | (2019.01) |
| *B60L 58/16* | (2019.01) |
| *B60L 58/20* | (2019.01) |

(52) U.S. Cl.
CPC .............. *G07C 5/004* (2013.01); *B60L 3/12* (2013.01); *B60L 53/60* (2019.02); *B60L 58/12* (2019.02); *B60L 58/16* (2019.02); *B60L 58/20* (2019.02); *B60L 2240/662* (2013.01); *B60L 2250/16* (2013.01)

(58) Field of Classification Search
CPC .......... B60L 58/10; B60L 58/12; B60L 58/16; B60L 58/18; B60L 3/12; G07C 5/004; G09G 2380/10
See application file for complete search history.

(56) References Cited

U.S. PATENT DOCUMENTS

| | | | |
|---|---|---|---|
| 9,346,365 B1 * | 5/2016 | Penilla | ..................... B60L 53/14 |
| 10,023,176 B2 | 7/2018 | Tabanoglu et al. | |
| 2010/0094496 A1 * | 4/2010 | Hershkovitz | ............. B60L 3/12 |
| | | | 701/22 |

(Continued)

OTHER PUBLICATIONS

De Cauwer, et al., "Energy Consumption Prediction for Electric Vehicles Based on Real-World Data," World Electr. Veh. J. 2015, 8(8): 8573-8593. https://doi.org/10.3390/en8088573.

(Continued)

*Primary Examiner* — Thomas G Black
*Assistant Examiner* — Sara J Lewandroski
(74) *Attorney, Agent, or Firm* — Michael Spenner; Eversheds Sutherland (US) LLP

(57) ABSTRACT

Electric vehicle predictive range estimating systems and methods are provided herein. An example method includes determining an initial state of charge (SOC) for an energy source of a vehicle at a first point in time; determining one or more boundary conditions for the vehicle during a time frame extending from the first point in time to a second point in time, the one or more boundary conditions causing a loss in the energy source during the time frame; determining a predicted future SOC for the energy source based on the one or more boundary conditions and the initial SOC; and predicting an availability of a vehicle operating condition based on the predicted future SOC for the energy source.

10 Claims, 4 Drawing Sheets

(56) References Cited

U.S. PATENT DOCUMENTS

| | | | |
|---|---|---|---|
| 2013/0179057 A1* | 7/2013 | Fisher | G01C 21/3492 701/117 |
| 2013/0204456 A1* | 8/2013 | Tippelhofer | B60L 53/305 701/1 |
| 2014/0379183 A1* | 12/2014 | Long | B60L 53/305 701/22 |
| 2015/0247734 A1* | 9/2015 | Okada | G01C 21/3469 701/423 |
| 2015/0362558 A1* | 12/2015 | Saint-Marcoux | G01R 31/367 702/63 |
| 2016/0167643 A1* | 6/2016 | Tabanoglu | B60W 40/00 701/22 |
| 2016/0368396 A1* | 12/2016 | Konet | G01C 21/3484 |
| 2017/0021737 A1* | 1/2017 | Park | B60L 53/20 |
| 2018/0065498 A1 | 3/2018 | Grewal et al. | |
| 2020/0149996 A1* | 5/2020 | Seenumani | F02D 29/02 |
| 2020/0166356 A1* | 5/2020 | Beaurepaire | B60L 58/12 |

OTHER PUBLICATIONS

Wang, et al., "Online Prediction of Battery Electric Vehicle Energy Consumption," World Electr. Veh. J. 2016, 8(1), 213-224; https://doi.org/10.3390/wevj8010213.

Range anxiety. Google Definition Search (2 pages). Retrieved from https://www.google.com/search?rtz=1C1GCEA_enDE801US804&q=Dictionary#dobs=range%20anxiety.

Tesla Motors Club. (2018). Poll for Model 3 owners: Vampire drain rates? (9 pages). Retrieved from https://teslamotorsclub.com/tmc/threads/poll-for-model-3-owners-vampire-drain-rates.114090/.

* cited by examiner

ELECTRIC VEHICLE PREDICTIVE RANGE ESTIMATING SYSTEMS AND METHODS

TECHNICAL FIELD

The present disclosure relates to systems and methods that provide predictive range estimations for energy sources, as well as indications for estimating no-start conditions, available range, and automated dispatching of charging services. These systems and methods can be utilized in battery electric vehicles (BEVs) and hybrid vehicles.

BACKGROUND

BEVs are growing in market share and are becoming more popular and readily available. While customers are becoming adjusted to BEVs, one of the biggest customer concerns is range anxiety. Range anxiety is defined as worry on the part of a person driving an electric car that the battery will run out of power before the destination or a suitable charging point is reached.

Range anxiety becomes a reality when BEVs are left unattended for extended periods of time due to a process referred to as vampire drain. Vampire drain is the loss of charge when a high-voltage battery sits idle. Some BEVs can lose between one to nine miles of range in a 24-hour-period depending on the battery types of the BEV. In some instances, both high- and low-voltage batteries could be depleted by the time the customer returns to his/her vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
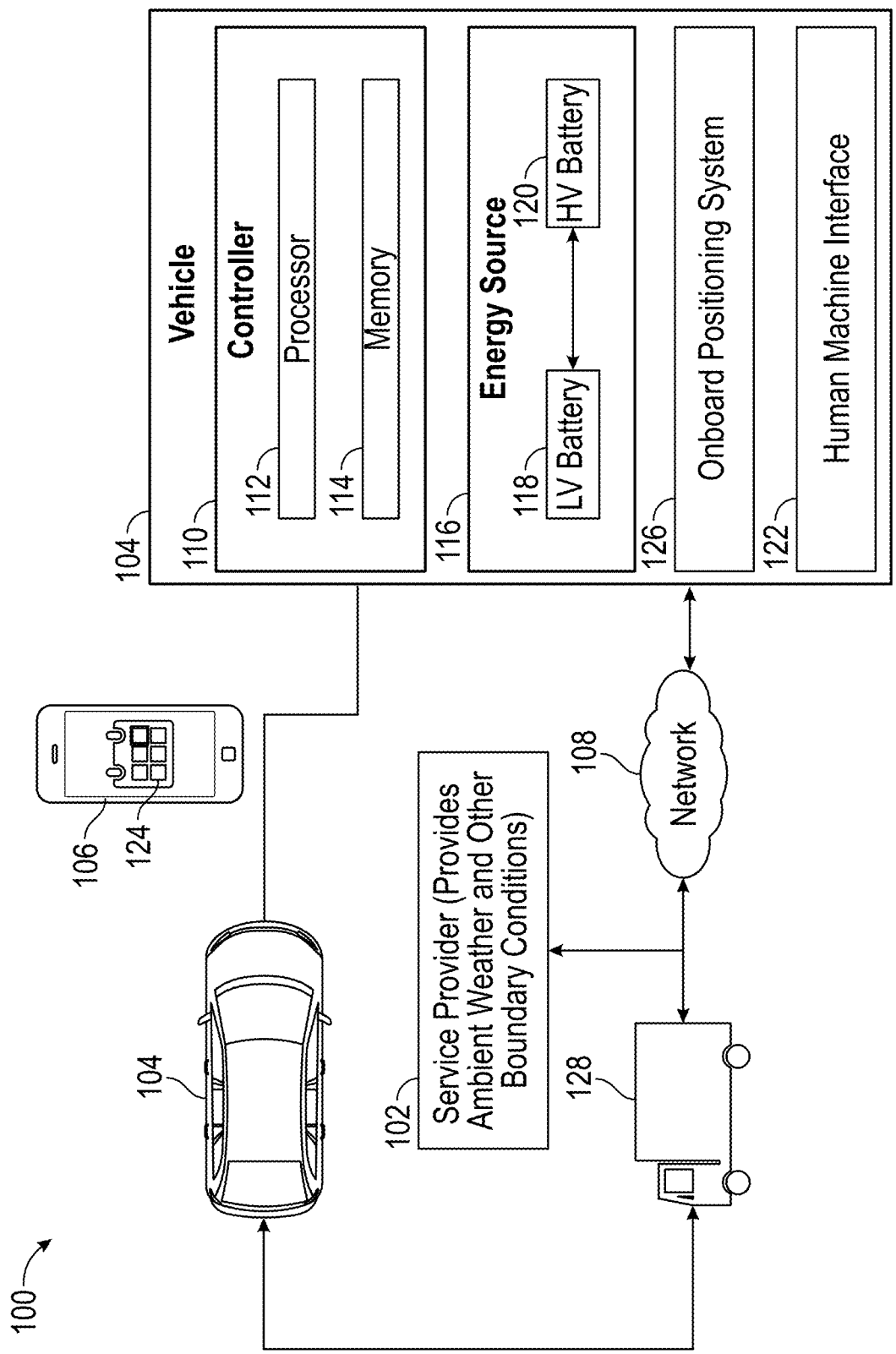
FIG. 1 depicts an illustrative architecture in which techniques and structures for providing the systems and methods disclosed herein may be implemented.

In some embodiments, the systems and methods disclosed herein provide predictive range estimations and determinations of no-start conditions, as well as the provision of actionable feedback to users through a human machine interface of a vehicle. As noted above, range anxiety becomes a reality when cars are left unattended for periods of time due to a process referred to as vampire drain. Vampire drain is a loss of charge of a high-voltage battery when a vehicle sits idle. The high-voltage battery can lose between one to nine miles of available range during a 24-hour period. To be sure, both the high and low voltage batteries could be depleted by the time the customer returns to his/her vehicle.

Some relevant questions that can be answered by the systems and methods of the present disclosure include, but are not limited to, how much range will a BEV have after a predetermined number of days from a current date in time? Even if a BEV has enough range to get to a charging station, will the BEV start at a date in the future? How long can a BEV sit in a key-off state and still retain a battery level that would allow for a determined amount of range? What services are available to ensure that a BEV will be ready to drive in the case of a prolonged absence?

Some embodiments disclosed herein provide a solution to these problems using in-vehicle or mobile device functionalities that automatically predict vehicle range and the battery's state of charge. In some embodiments, these functionalities may provide useful future predictions for the range and state of charge (SOC) of an energy source, such as a battery of a BEV, based on current/initial conditions and expected boundary conditions forecasted or estimated into the future.

In some embodiments, these features are enabled using a vehicle's electronic control unit (ECU), also referred to generally as a controller. The controller can be configured to inform a driver about a number of days until a no-start condition is reached and a future vehicle range. In various embodiments, a future vehicle range could be an available vehicle range upon return from a trip given a set number of days, based on current and future environmental conditions (could be input either manually or automatically from a service provider). A future vehicle range could be a number of days the vehicle can sit until a certain available range is reached (i.e., compare time away to minimum range required upon return). In another example, future vehicle range could include different methods for having the vehicle's low-voltage (LV) and high-voltage (HV) batteries charged (i.e., use a certain level of HV-to-LV energy transfer, as required to meet a minimum available range). The features such as SOC level, future vehicle range, and so forth are generally and collectively referred to as vehicle operating condition(s). These and other advantages of the present disclosure are provided in greater detail herein with reference to the collective drawings.

Illustrative Architecture

Turning now to the drawings, FIG. 1 depicts an illustrative architecture 100 in which techniques and structures of the present disclosure may be implemented. The illustrative architecture 100 may include a service provider 102, a vehicle 104, a mobile device 106, and a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct.

Generally, the vehicle 104 comprises a controller 110 that in turn comprises a processor 112 and a memory 114. The memory 114 includes instructions that can be executed by the processor 112 to provide the BEV with the predictive features disclosed herein. That is, the processor 112 is a specifically configured and special purpose computing device that can be configured in accordance with the embodiments disclosed herein.

In some embodiments, the vehicle 104 further comprises an energy source 116 that can comprise both an LV battery 118 and an HV battery 120. The LV battery 118 provides for low voltage or short operations such as vehicle start, accessories, and other features. The HV battery 120 provides energy for high-voltage or long-term usage such as powering the drivetrain of the vehicle 104 and operating the climate control systems and the like.

If the LV battery 118 is depleted through use or loss, contactors on the HV battery 120 cannot be engaged (engine start or key-on event), and the vehicle 104 cannot be driven. The LV battery 118 may be designed to power an idle (key-off) vehicle for 40 days (or other selected time frame) without being recharged.

On some BEVs, HV-to-LV energy transfer may occur allowing the LV battery 118 to be operable for periods beyond the 40 days (or for 40 days in the case of a downsized LV battery 118). However, once a state of charge (SOC) of the HV battery 120 drains below a threshold value (in some embodiments approximately 9%), the energy transfer between the LV battery 118 and the HV battery 120 can be disabled by the controller 110. If the LV battery 118 does not have a sufficient charge then at this point, the LV battery 118 may be unable to start the vehicle 104.

In one or more embodiments, the controller 110 may be configured to determine, for each of the LV battery 118 and the HV battery 120 of the vehicle at a first point in time, any combination of an initial state of charge (SOC), a state of health (SOH), energy transfer rates, and self-discharge rates. These component level values can be determined by the controller 110 based on recent historical data for the vehicle.

In various embodiments, the controller 110 can be configured to calculate a range upon return (based on an available SOC at the end of a specified time frame) using any combination of ambient temperature over a specified time frame, HV and LV SOC over the specified time frame, HV-to-LV energy transfer events over the specified time frame, self-discharge rates for the HV and LV batteries over the specified time frame, SOH for the HV and/or LV batteries, key-off loads, and a length of the specified time frame, as well as other boundary conditions and/or vehicle specific properties that induce loss in the energy source of the vehicle. In some embodiments, the controller 110 can utilize historical information for any of these historical vehicle properties or behaviors to specify data such as HV and LV SOC, HV and LV SOH, self-discharge rates, energy transfer events, and so forth.

The controller 110 may be configured to determine one or more boundary conditions for the vehicle at a first point in time and a second point in time, and/or for each day extending therebetween. In general, boundary conditions include external or ambient factors that can cause a loss in the energy source 116. In some embodiments, these boundary conditions may be determined for a time frame extending between the first point in time and the second point in time.

In one example embodiment, the boundary conditions can comprise at least a current ambient temperature at the first point in time and an estimated ambient temperature at the second point in time. The boundary conditions, such as weather data, can be obtained from the service provider 102, or from any third-party system or service that provides boundary condition data.

The initial SOC is a value that is between zero and 100% and represents a level of charge of a battery. The SOH can include a determination as to how efficient a battery is with regard to holding a charge over time. An energy transfer rate relates to how efficiently the battery can be discharged and/or charged, and/or how many charging cycles the battery has experienced. The self-discharge rates may indicate how readily the battery discharges energy when not being used.

The controller 110 can also be configured to predict an available range for the vehicle at the second point in time using the one or more boundary conditions, the initial SOC, the SOH, energy transfer rates, and self-discharge rates. These values can be displayed to a driver in some embodiments.

According to some embodiments, the vehicle 104 can comprise a human machine interface (HMI 122). The controller 110 can be configured to allow the HMI 122 to receive one or more of the boundary conditions and/or other user input in some embodiments. In one example, the HMI 122 provides a graphical user interface that allows a user to input at least an indication of the second point in time and/or the estimated current and/or future temperature values. The HMI 122 can display on the graphical user interface a predicted future SOC as well as other predictive values for the energy source 116 of the vehicle 104. Example graphical user interfaces that can be displayed on the HMI 122 are provided in FIGS. 2 and 3, which are described in greater detail infra.

As noted above, rather than, or in addition to implementing the predictive features disclosed herein through the controller 110 and the HMI 122 of the vehicle, the same can be implemented through an application 124 that can execute on the mobile device 106. That is, the mobile device 106 is configured to communicate with at least one of the controller 110 and/or the service provider 102 to provide the predictive features disclosed herein. For purposes of clarity, the following descriptions of embodiments will reference the controller 110 of the vehicle 104, but it will be understood that these embodiments can likewise be implemented through the application 124 or the service provider 102 in a server-client relationship with either the mobile device 106 and/or the controller 110 of the vehicle 104.

Generally, the controller 110 can be configured to determine an initial state of charge (SOC) for the energy source 116 of the vehicle 104 at a first point in time. This can include the controller 110 determining a current charge state for the LV battery 118 and/or the HV battery 120. Once the SOC for the LV battery 118 and/or the HV battery 120 (referred to collectively as the energy source 116) is known, the controller 110 can then determine one or more boundary conditions for the vehicle for the current point in time (e.g., the first point in time). As noted above, the one or more boundary conditions can include weather conditions such as an ambient temperature at a location of the vehicle 104. Broadly speaking, a boundary condition includes any external condition that produces loss in the energy source 116.

In some embodiments, the controller 110 can utilize an onboard positioning system 126 of the vehicle 104 such as a GPS system to obtain a current location of the vehicle 104. In other embodiments, the location of the vehicle 104 can be obtained using information from the network 108, such as cellular triangulation. In another embodiment, the location of the vehicle 104 can be received from the service provider 102, if the service provider 102 is tracking a location of the vehicle 104. The weather data can be obtained by the controller 110 from the service provider 102. The service provider 102 can obtain the weather data from a third-party service or system in some embodiments.

Using the current charge state and the weather data obtained, the controller 110 can determine an available range for the energy source 116. The available range is an example vehicle operating condition and can be calculated by determining how far the vehicle 104 can travel until an SOC of the energy source 116 reaches an SOC threshold. Using the examples provided above, the available range can include where the SOC of the HV battery 120 has fallen below a threshold value (in some embodiments approximately 9%). Other methods for determining or measuring an available range can also be utilized. Some embodiments allow a driver of the vehicle to establish the available range.

In some embodiments, the available range for the energy source 116 can be determined over a time frame that extends between a first point in time and a second point in time. In various embodiments, the user can specify this second point in time. For example, a driver of the vehicle 104 can specify that the driver would like to estimate an available range for the vehicle 104 for five days measured from a current point in time.

Using this second point in time, the controller 110 can obtain boundary conditions for a time frame extending between the first point in time and the second point in time. In one example, the controller 110 obtains boundary conditions for a current day, Monday, as well as for each of the next four days until the second point in time, which would be Friday. The controller 110 can obtain boundary conditions, such as forecasted weather for each of these days. Using the forecasted weather data, the controller 110 can calculate an estimated available range for the vehicle when the user returns on that Friday.

In addition to using forecasted losses due to weather, the controller 110 can also use other loss data for the energy source 116. That is, each energy source 116 has its own unique type(s) of inherent losses that are due to the limitations of the battery or batteries included therein. In some embodiments, the losses can be specific to and different for each of the LV battery 118 and/or the HV battery 120 of the energy source 116. The controller 110 can determine these loss values using historical energy source performance data analyses.

In other embodiments, various vehicle-specific functions can also cause loss or use of battery charge. For example, vehicle features such as an alarm system and the like can cause battery drain during key-off times. Losses can also be determined from historical key-off battery discharge performance data collected over time.

Exchanges between the LV battery 118 and the HV battery 120 can also induce losses. As noted above, the HV battery to LV battery energy transfer may occur to ensure the LV battery is operable for a set period of time. This loss in the HV battery SOC may affect the estimated available range.

Thus, in addition to boundary conditions, the controller 110 can utilize inherent vehicle properties or operational statuses to further refine the estimated available range for the vehicle 104 or any of the other predicted vehicle operating conditions disclosed herein.

Another example of a predicted vehicle operating condition can include an ability of the vehicle to reach a nearest charging station based on a predicted future SOC. In this instance, the controller 110 can determine a location of the nearest charging station. The controller 110 can compare a current location of the vehicle 104 with the location of the nearest charger and determine a distance therebetween. This distance informs the controller 110 as to an ability of the vehicle to reach the nearest charger.

In yet another embodiment, the vehicle operating condition that is determined by the controller 110 includes a duration for the time frame (between the first and second points in time) which would allow the predicted future SOC to be at or above a predetermined value. For example, the driver would like to ensure that the SOC of the energy source 116 of the vehicle 104 is at or above 40% SOC at the second point in time.

In an additional embodiment, the vehicle operating condition that is determined by the controller 110 includes a no-start condition based on the initial SOC and the one or more boundary conditions, as well as the loss values for the energy source 116. This no-start condition can include any portion of the energy source 116 being at a desired SOC at which the vehicle will not start. For example, the LV battery 118 has an SOC that does not allow the LV battery 118 to activate contactors of the HV battery 120. Correspondingly, the HV battery 120 may not have sufficient SOC to allow for a transfer of energy to the LV battery 118 that would allow the LV battery 118 to start the HV battery 120. This process can be further conditioned by also requiring the HV battery 120 to maintain enough reserve SOC to allow the vehicle 104 to reach a nearest charging station.

In an example use case, the controller 110 obtains from the driver and/or other external databases (or service provider 102) information such as a number of days until return, current outside temperature, estimated temperature upon return, and minimum desired vehicle range. In some embodiments, the minimum vehicle range could be broadcasted and/or suggested by the service provider 102 or the controller 110 based on previous trip data.

Vehicle specific inputs can include initial HV and LV battery SOC and SOH, features that are left on when the vehicle sits at idle, real-time temperature (if the user wants to check the vehicle range while away), HV and LV battery size, and idle key-off discharge performance of the vehicle from previously collected data. Idle key-off discharge performance can be collected on a recurrent or continuous basis to ensure that the vehicle's idle discharge properties are consistent with the current HV and LV battery degradation. Calculations for range and "days until no-start condition" may be based off current estimation methods for other similar vehicles. Estimated available range and "days until no-start condition" estimations may be generated automatically during the day, for example. Upon estimation results, the driver may be notified through the HMI 122 (or the application 124 of the mobile device 106) about the current state of the driver's vehicle.

Figure 2:
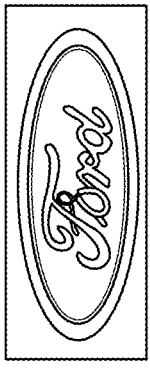
FIG. 2 is an example of an interactive graphical user interface that can be displayed on a human machine interface of a vehicle configured in accordance with the present disclosure.

FIG. 2 is an example graphical user interface, GUI 200, that can be displayed on any of the computing devices disclosed herein. For example, the GUI 200 can comprise an indication 202 of a current ambient temperature. As noted above, the current ambient temperature is one of the one or more boundary conditions. The GUI 200 also includes an indication 204 of a number of days until a no-start condition for the energy source (e.g., LV and/or HV batteries) is reached based on the initial SOC and the one or more boundary conditions.

In various embodiments, the GUI 200 can include an indication 206 of a current available range for the energy source based on the initial SOC, as well as an indication 208 of a distance to the nearest charging station. In one or more embodiments, the GUI 200 can include an indication 210 of a distance to a home charging station. For example, this can include a location of a driver's home charging station.

The GUI 200 can also comprise one or more interactive features. In some embodiments, the GUI 200 includes a charging alert activator 212, such as a UI button. When depressed or otherwise actuated, controller of the vehicle transmits a request to a charging service to charge the energy source. In various embodiments, this can include dispatching an on-demand charging service (see on-demand charging service 128 of FIG. 1) to charge the vehicle. Rather than relying on the driver to activate a request for an on-demand charging service 128, the controller of the vehicle can be configured to automatically dispatch the on-demand charging service 128 when an SOC of the energy source of the vehicle falls below an SOC threshold. The SOC threshold can be tied to an available range or can be a percentage value such as 10% of the total charge for the energy source. In various embodiments, the controller of the vehicle can automatically transmit a request to a service provider when the current available range for the energy source is less than the distance to the nearest charging facility.

In one or more embodiments, the GUI 200 can comprise a toggle 214 that allows charging for the LV battery of the energy source to be selectively activated or deactivated. As noted above, the LV battery can drain energy from the HV battery to ensure that the LV battery possesses enough charge to activate the HV battery. This battery sharing functionality can be disabled through the toggle 214. In some instances, the boundary conditions such as current temperature are obtained over the network 108 from the service provider 102 or another system. The current temperature can also be obtained from an onboard thermometer. In some embodiments, current date 216 and desired range 218 inputs are also provided.

Figure 3:
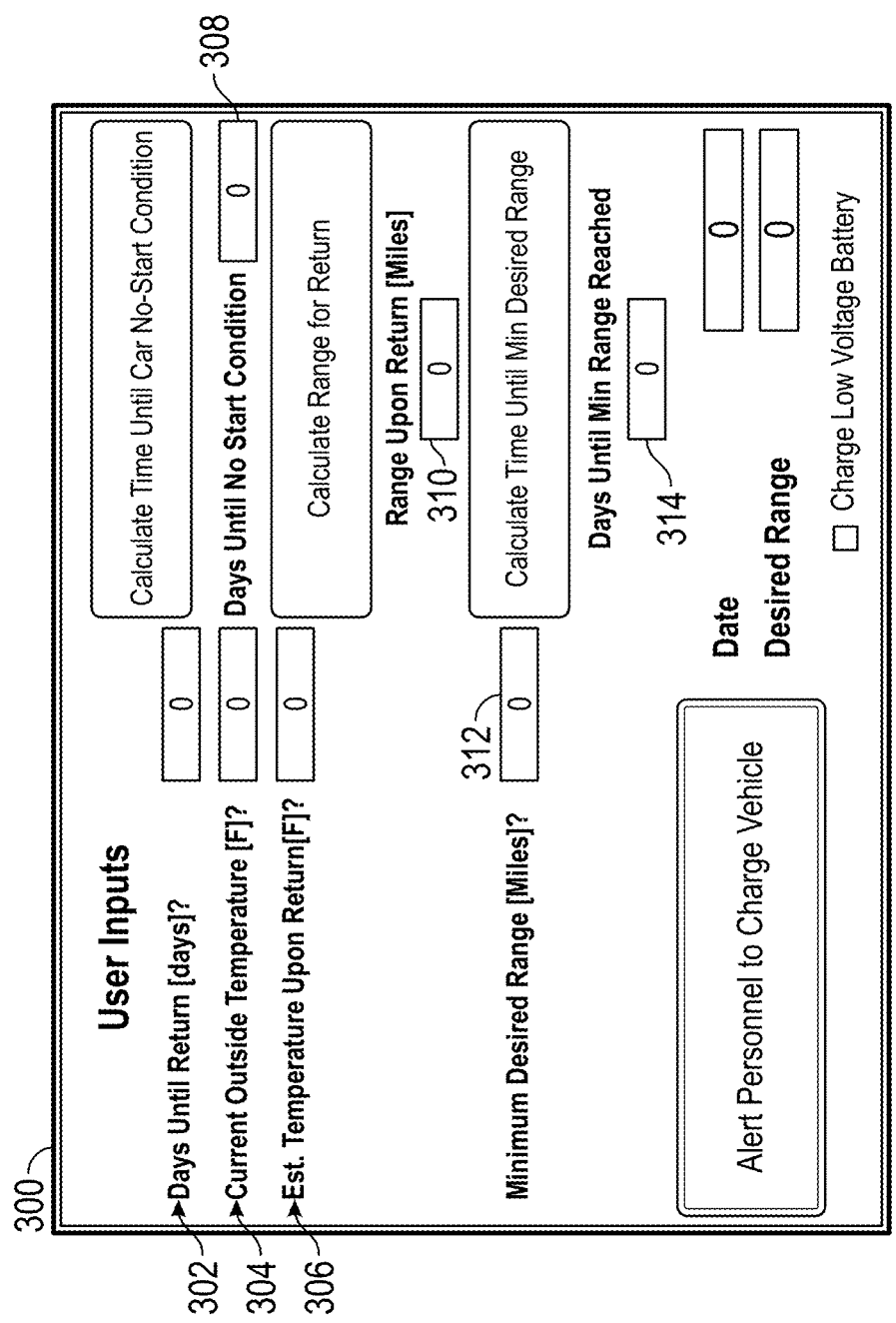
FIG. 3 is another example of an interactive graphical user interface that can be displayed on a human machine interface of a vehicle configured in accordance with the present disclosure.

FIG. 3 is an example graphical user interface, GUI 300, that can be displayed on any of the computing devices disclosed herein. The GUI 300 includes various inputs that allow a user to specify boundary conditions or desired vehicle operating condition(s), such as desired range, SOC thresholds, and other conditions.

In various embodiments, the GUI 300 includes one or more user inputs corresponding to a duration of the time frame, a current ambient temperature, and an estimated ambient temperature at the second point in time. The GUI 300 includes a number of days until return input 302, which is referred to generally as the second point in time, with the current day being the first point in time. This allows the driver to specify the duration of the time frame between the first point in time and the second point in time.

The driver can also specify a current ambient temperature in input 304, as well as an estimated temperature upon return in input 306. Rather than requiring the driver to specify these values, the current and future ambient temperature conditions can be obtained over the network 108 from any suitable service. In one embodiment, the current and/or future ambient temperature data (e.g., boundary conditions) are determined from the data made available by the mobile device of the driver (see FIG. 1).

The GUI 300 comprises an indication 308 of a number of days until a no-start condition for the energy source is reached based on the initial SOC and the one or more boundary conditions based on the user inputs. A range upon return indication 310 can also be provided. That is, the inputs 302-306 inform a calculation of the number of days until a no-start condition. In some embodiments, the GUI 300 includes an input 312 that allows a driver to select a minimum desired range, which allows the GUI 300 to display an indication 314 of a time until the minimum desired range has been reached based on the user inputs and the selection of the minimum desired range. In some embodiments, the GUI 300 also includes a charging alert activator, such as a UI button and a toggle as disclosed above with respect to FIG. 2.

Referring back to FIG. 1, in one example use case, when a vehicle is parked, the controller of the vehicle may detect that the energy source 116 has 50 kWh of usable energy. The controller 110 may know from past operation that the driver uses about 250 Wh/mile of energy to operate the vehicle. The controller 110 can also determine an SOC of the LV battery and its capacity so the controller 110 knows when an HV battery to LV battery is needed to maintain the LV battery status. GPS data can provide the controller 110 with data about where the vehicle is parked, and the controller can use that data along with user specified dates to determine expected daily temperatures for all future days. Based on the above data, the controller 110 can calculate a range that is expected for all future days. The provided range is reflective of what range the vehicle may be expected to provide if the vehicle is next driven on the specific day. This information may be displayed on the HMI of the vehicle in a calendar format. Because of the temperature impacts, some low temperature days may evidence a lower range than following days where the temperature has increased. To be sure, this does not indicate a gain of energy but rather that on those days, the expected weather should allow for increased range.

In some embodiments, the controller 110 can govern an energy usage rate for vehicle operation based on a distance to a nearest charging station. For example, if the driver typically uses 250 Wh/mile of energy to operate the vehicle, the controller 110 is configured to govern the use of the energy source 116 to only allow vehicle operation of 150-200 Wh/mile of energy usage.

When the driver enters the vehicle, the driver may be provided with the option to choose between an automated range and "no start condition" calculator or to manually input conditions for hypothetical/future situations (see FIG. 2 versus FIG. 3 above). This controller 110 can also provide preventive features to ensure customer satisfaction with the electric vehicle. For example, once the "days until no-start condition" value hits five days or the "current range" is below the "nearest charging facility" or "distance to home" distance, an alert can be automatically transmitted to the driver's mobile device 106 to make the driver aware that his/her vehicle may be inoperable if the driver does not act soon. This would be useful for a car in storage, notifying the customer to recharge the vehicle, for example.

Figures 4, 5:
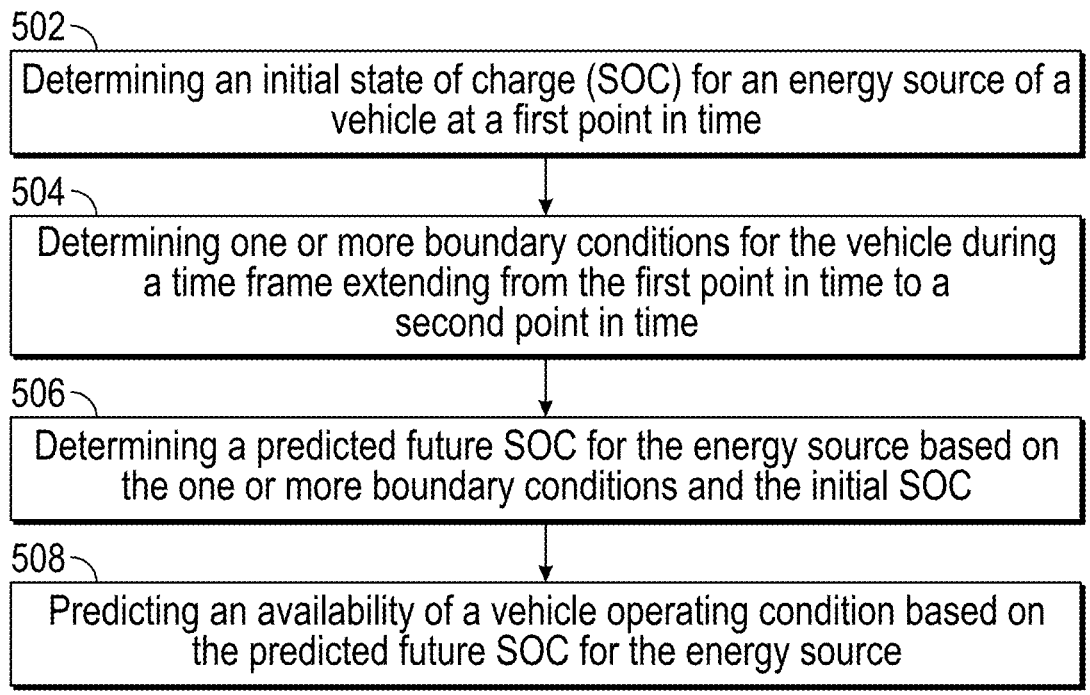
FIG. 4 is a representation of an example range calendar that is generated in accordance with embodiments of the present disclosure.
FIG. 5 is a flowchart of an example method of the present disclosure.

In one embodiment, the controller 110 can provide a driver with a range calendar 400 as illustrated in FIG. 4. The calendar 400 may be displayed on the HMI 122 and/or the mobile device 106 (or other user device such as a smart watch or computer). This calendar 400 may be continually updated based on a current energy content of the HV battery, an expected Wh/mile for operation of the vehicle (either from a standard generic value or based upon the driver's previous behavior), key-off loads, expected energy transfers, any planned actions such as vehicle software updates and historical weather data for the region where the vehicle is parked, as well as any of the other vehicle parameters and/or boundary conditions disclosed herein—just to name a few. The calendar 400 includes a plurality of days such as days 402-410, which correspond to Monday-Friday of a week. Any desired boundary conditions can be obtained for these days, such as ambient temperature. The calendar can display information, which in this example includes both SOC and available range.

According to some embodiments, when notified, the driver may be presented with a map of charger locations which the vehicle can make it to, based on available vehicle range. Alternatively, if the vehicle is disabled because the driver cannot make it to a charging station in time, services such as tow truck companies can be queried and mapped. Another integrated option would include the drivers being provided an opportunity to schedule a third-party charge, such as a mobile charging company to charge their vehicles. Charging can occur through LV and/or HV energy transfer and can be scheduled based on specific data. This feature is useful if plans change, and the user needs to drive further than initially anticipated regardless if the vehicle is low on charge.

In some embodiments, the controller of the vehicle is configured to generate a range calendar for an energy source of a vehicle using any combination of an initial state of charge (SOC) of the energy source, an expected energy consumption rate for the energy source based on an estimate or historical data, an estimated number of key-on or key-off events, expected energy transfers based on the historical data, and one or more boundary conditions for at least a portion of the days specified in the range calendar. In some embodiments, the controller provides the range calendar for display on a display device.

FIG. 5 is a flowchart of an example method of the present disclosure. The method includes a step 502 of determining an initial state of charge (SOC) for an energy source of a vehicle at a first point in time. The method can also include a step 504 of determining one or more boundary conditions for the vehicle during a time frame extending from the first point in time to a second point in time. In general, the one or more boundary conditions cause or contribute, either directly or indirectly, to a loss in the energy source during the time frame. Next, the method includes a step 506 of determining a predicted future SOC for the energy source based on the one or more boundary conditions and the initial SOC, as well as a step 508 of predicting an availability of a vehicle operating condition based on the predicted future SOC for the energy source.

Example Embodiments

In some instances, the following examples may be implemented together or separately by the systems and methods described herein.

Example 1 may include a method, comprising: determining an initial state of charge (SOC) for an energy source of a vehicle at a first point in time; determining one or more boundary conditions for the vehicle during a time frame extending from the first point in time to a second point in time, the one or more boundary conditions causing a loss in the energy source during the time frame; determining a predicted future SOC for the energy source based on the one or more boundary conditions and the initial SOC; and predicting an availability of a vehicle operating condition based on the predicted future SOC for the energy source.

Example 2 may include the method according to example 1, wherein the energy source comprises a low-voltage battery and a high-voltage battery.

Example 3 may include the method according to example 1 and/or some other example herein, wherein the vehicle operating condition comprises an available range for the energy source.

Example 4 may include the method according to example 1 and/or some other example herein, further comprising determining a location of a nearest charger for the energy source, and wherein the vehicle operating condition comprises an ability of the vehicle to reach the nearest charger based on the predicted future SOC.

Example 5 may include the method according to example 1 and/or some other example herein, further comprising determining a duration for the time frame which would allow the predicted future SOC to be at or above a predetermined value.

Example 6 may include the method according to example 1 and/or some other example herein, further comprising determining a no-start condition based on the initial SOC and the one or more boundary conditions.

Example 7 may include the method according to example 1 and/or some other example herein, wherein the one or more boundary conditions comprise at least a current ambient temperature for a location of the vehicle during the time frame.

Example 8 may include the method according to example 1 and/or some other example herein, further comprising: receiving an indication of the second point in time from a user through a human machine interface (HMI) of the vehicle; and displaying the predicted future SOC on the HMI.

Example 9 may include the method according to example 8 and/or some other example herein, wherein the HMI provides a graphical user interface having: a current ambient temperature, the current ambient temperature being one of the one or more boundary conditions; a number of days until a no-start condition for the energy source is reached based on the initial SOC and the one or more boundary conditions; an indication of a current available range for the energy source based on the initial SOC; an indication of a distance to a nearest charging station; an indication of a distance to a home charging station; a charging alert activator, wherein when depressed the charging alert activator causes a controller of the vehicle to transmit a request to a charging service to charge the energy source; and a toggle allowing charging for a low-voltage battery of the energy source to be selectively activated or deactivated.

Example 10 may include the method according to example 9 and/or some other example herein, further comprising automatically transmitting a request to a service provider when the current available range for the energy source is less than the distance to a nearest charging facility.

Example 11 may include the method according to example 8 and/or some other example herein, wherein the HMI provides a graphical user interface having: user inputs corresponding to a duration of the time frame, a current ambient temperature, and an estimated ambient temperature at the second point in time; an indication of a number of days until a no-start condition for the energy source is reached based on the initial SOC and the one or more boundary conditions based on the user inputs; a selection of a minimum desired range; an indication of a time until the minimum desired range has been reached based on the user inputs and the selection of the minimum desired range; and a toggle allowing charging for a low-voltage battery of the energy source to be selectively activated or deactivated.

Example 12 may include a method, comprising: generating a range calendar for an energy source of a vehicle using: an initial state of charge (SOC) of the energy source; an expected energy consumption rate for the energy source based on an estimate or historical data; an estimated number of key-on or key-off events; expected energy transfers based on the historical data; and one or more boundary conditions for at least a portion of the days specified in the range calendar; and providing the range calendar for display on a display device.

Example 13 may include the method according to example 12, further comprising generating a map for display that comprises locations of one or more charging stations based on a current location of the vehicle.

Example 14 may include the method according to example 12 and/or some other example herein, further comprising transmitting an alert to a mobile device when the energy source is within a predetermined number of days of a no-start condition for the energy source.

Example 15 may include the method according to example 13 and/or some other example herein, further comprising transmitting an alert to a mobile device when a current SOC of the energy source is at or below an SOC threshold, the SOC threshold being measured as a function of the current SOC and a distance to a nearest charging station.

Example 16 may include a system, comprising: a vehicle comprising an energy source having a low-voltage battery and a high-voltage battery, the vehicle comprising a controller having a processor and a memory for storing executable instructions, the processor being configured to execute the instructions stored in the memory to: determine for each of the low-voltage battery and the high-voltage battery of the vehicle at a first point in time: an initial state of charge (SOC); a state of health (SOH); energy transfer rates; and self-discharge rates; determine one or more boundary conditions for the vehicle at the first point in time and a second point in time, the one or more boundary conditions causing a loss in the energy source during a time frame extending between the first point in time and the second point in time, the one or more boundary conditions comprising at least a current ambient temperature at the first point in time and an estimated ambient temperature at the second point in time; and predict a range for the vehicle at the second point in time using the one or more boundary conditions, the initial SOC, the SOH, the energy transfer rates, and the self-discharge rates.

Example 17 may include the system according to example 16, wherein the vehicle further comprises a human machine interface (HMI), wherein the processor is further configured to execute the instructions stored in the memory to: receive an indication of the second point in time from a user through the HMI; and display a predicted future SOC on the HMI.

Example 18 may include the system according to example 17 and/or some other example herein, wherein the HMI provides a graphical user interface having: a current ambient temperature, the current ambient temperature being one of the one or more boundary conditions; a number of days until a no-start condition for the energy source is reached based on the initial SOC and the one or more boundary conditions; an indication of a current available range for the energy source based on the initial SOC; an indication of a distance to a nearest charging station; an indication of a distance to a home charging station; a charging alert activator, wherein when depressed the charging alert activator causes a controller of the vehicle to transmit a request to a charging service to charge the energy source; and a toggle allowing charging for a low-voltage battery of the energy source to be selectively activated or deactivated.

Example 19 may include the system according to example 18 and/or some other example herein, wherein the processor is further configured to execute the instructions stored in the memory to automatically transmit a request to a service provider when the current available range for the energy source is less than the distance to a nearest charging facility.

Example 20 may include the system according to example 19 and/or some other example herein, wherein the HMI provides a graphical user interface having: user inputs corresponding to a duration of the time frame, a current ambient temperature, and an estimated ambient temperature at the second point in time; an indication of a number of days until a no-start condition for the energy source is reached based on the initial SOC and the one or more boundary conditions based on the user inputs; a selection of a minimum desired range; an indication of a time until the minimum desired range has been reached based on the user inputs and the selection of the minimum desired range; and a toggle allowing charging for a low-voltage battery of the energy source to be selectively activated or deactivated.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining a first initial state of charge (SOC) for a low-voltage battery of a vehicle and a second initial SOC for a high-voltage battery of the vehicle at a first point in time, the low-voltage battery and high voltage battery comprising an energy source of the vehicle;
   determining one or more boundary conditions for the vehicle during a time frame extending from the first point in time to a second point in time, the one or more boundary conditions causing a loss in the low-voltage battery and the high-voltage battery during the time frame;
   determining a first predicted future SOC for the low-voltage battery and a second predicted future SOC for the high-voltage battery based on the one or more boundary conditions and the first initial SOC and second initial SOC;
   determining that the first predicted future SOC is below a threshold value and the second predicted future SOC is above the threshold value; and
   determining, based on the determination that the first predicted future SOC is below the threshold value and the second predicted future SOC is above the threshold value, a no-start condition of the vehicle.

2. The method according to claim 1, wherein the one or more boundary conditions comprise at least a current ambient temperature for a location of the vehicle during the time frame.

3. The method according to claim 1, further comprising: predicting an availability of a vehicle operating condition based on the predicted future SOC for the energy source, wherein the vehicle operating condition comprises an available range for the energy source.

4. The method according to claim 3, further comprising determining a location of a nearest charger for the energy source, and wherein the vehicle operating condition comprises an ability of the vehicle to reach the nearest charger based on the first predicted future SOC or the second future predicted SOC.

5. The method according to claim 1, further comprising determining a duration for the time frame which would allow the first predicted future SOC or the second future predicted SOC to be at or above a predetermined value.

6. The method according to claim 1, further comprising:
receiving an indication of the second point in time from a user through a human machine interface (HMI) of the vehicle; and
displaying the first predicted future SOC or the second future predicted SOC on the HMI.

7. The method according to claim 6, wherein the HMI provides a graphical user interface having:
a current ambient temperature, the current ambient temperature being one of the one or more boundary conditions;
a number of days until a no-start condition for the energy source is reached based on the initial SOC and the one or more boundary conditions;
an indication of a current available range for the energy source based on the first predicted future SOC or the second future predicted SOC;
an indication of a distance to a nearest charging station;
an indication of a distance to a home charging station;
a charging alert activator, wherein when depressed the charging alert activator causes a controller of the vehicle to transmit a request to a charging service to charge the energy source; and
a toggle allowing charging for a low-voltage battery of the energy source to be selectively activated or deactivated.

8. The method according to claim 7, further comprising automatically transmitting a request to a service provider when the current available range for the energy source is less than the distance to a nearest charging facility.

9. The method according to claim 6, wherein the HMI provides a graphical user interface having:
user inputs corresponding to a duration of the time frame, a current ambient temperature, and an estimated ambient temperature at the second point in time;
an indication of a number of days until a no-start condition for the energy source is reached based on the first predicted future SOC or the second future predicted SOC and the one or more boundary conditions based on the user inputs;
a selection of a minimum desired range;
an indication of a time until the minimum desired range has been reached based on the user inputs and the selection of the minimum desired range; and
a toggle allowing charging for a low-voltage battery of the energy source to be selectively activated or deactivated.

10. A method, comprising:
determining an initial state of charge (SOC) for an energy source of a vehicle at a first point in time;
determining one or more boundary conditions for the vehicle during a time frame extending from the first point in time to a second point in time, the one or more boundary conditions causing a loss in the energy source during the time frame;
determining a predicted future SOC for the energy source based on the one or more boundary conditions and the initial SOC;
predicting an availability of a vehicle operating condition based on the predicted future SOC for the energy source;
receiving an indication of the second point in time from a user through a human machine interface (HMI) of the vehicle; and
displaying the predicted future SOC on the HMI, wherein the HMI provides a graphical user interface having:
user inputs corresponding to a duration of the time frame, a current ambient temperature, and an estimated ambient temperature at the second point in time;
an indication of a number of days until a no-start condition for the energy source is reached based on the initial SOC and the one or more boundary conditions based on the user inputs;
a selection of a minimum desired range;
an indication of a time until the minimum desired range has been reached based on the user inputs and the selection of the minimum desired range; and
a toggle allowing charging for a low-voltage battery of the energy source to be selectively activated or deactivated.

* * * * *